(12) United States Patent
Ibuki et al.

(10) Patent No.: US 8,705,174 B2
(45) Date of Patent: Apr. 22, 2014

(54) ANTIGLARE FILM, POLARIZING PLATE, AND IMAGE DISPLAY DEVICE

(75) Inventors: Shuntaro Ibuki, Minami-Ashigara (JP); Kenichi Fukuda, Minami-Ashigara (JP); Hiroyuki Yoneyama, Minami-Ashigara (JP); Tokuju Oikawa, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1042 days.

(21) Appl. No.: 12/512,608

(22) Filed: Jul. 30, 2009

(65) Prior Publication Data
US 2010/0027116 A1    Feb. 4, 2010

(30) Foreign Application Priority Data

Jul. 30, 2008 (JP) .............................. P2008-196936

(51) Int. Cl.
| G02B 5/30 | (2006.01) |
| G02B 5/02 | (2006.01) |
| G02B 1/11 | (2006.01) |
| G02F 1/1335 | (2006.01) |

(52) U.S. Cl.
USPC ...... 359/487.01; 359/599; 359/601; 349/137; 428/323; 428/325; 428/327; 428/332

(58) Field of Classification Search
USPC ............. 359/487.01, 601, 613, 599; 349/137; 428/156, 174, 323, 325, 327, 332, 481, 428/507, 688
See application file for complete search history.

(56) References Cited

U.S. PATENT DOCUMENTS

| 5,919,555 A | * | 7/1999 | Yasuda et al. ................. 428/206 |
| 6,696,140 B2 | * | 2/2004 | Suzuki ........................ 428/212 |
| 6,731,363 B2 | * | 5/2004 | Nakamura et al. ............ 349/137 |
| 7,354,163 B2 | * | 4/2008 | Suzuki et al. ................. 359/601 |
| 7,371,439 B2 | * | 5/2008 | Matsunaga et al. ............ 428/1.3 |
| 7,604,358 B2 | * | 10/2009 | Ninomiya et al. ............. 359/601 |
| 7,661,832 B2 | * | 2/2010 | Iwata et al. .................... 359/601 |
| 7,813,038 B2 | * | 10/2010 | Inoue et al. ............. 359/485.01 |
| 2002/0044356 A1 | * | 4/2002 | Arakawa et al. ............. 359/566 |
| 2008/0137206 A1 | * | 6/2008 | Nakamura et al. ............ 359/601 |

FOREIGN PATENT DOCUMENTS

| JP | 7-290652 A | 11/1995 |
| JP | 10-325901 A | 12/1998 |
| JP | 11-305010 A | 11/1999 |
| JP | 2003-34761 A | 2/2003 |

(Continued)

OTHER PUBLICATIONS

Japanese Office Action with the English translation dated Apr. 3, 2012, for Application No. 2008-196936.

(Continued)

Primary Examiner — Ricky D Shafer
(74) Attorney, Agent, or Firm — Birch, Stewart, Kolasch & Birch, LLP (57) ABSTRACT

An antiglare film is provided, the antiglare film including a transparent plastic film substrate; an antiglare layer having fine recesses and projections on the surface thereof; and an abrasion resistant layer provided at an uppermost surface of the antiglare film, the abrasion resistant layer having an average film thickness of from 0.03 to 0.4 μm, wherein the abrasion resistant layer is formed from a curable composition containing at least following components (A), (B), and (C): (A) an inorganic fine particle containing silicon oxide as a main component and having an average particle size of from 1 to 300 nm; (B) an ionizing radiation-curable resin; and (C) a polymer thickener.

9 Claims, 2 Drawing Sheets

(56) References Cited

FOREIGN PATENT DOCUMENTS

| | | |
|---|---|---|
| JP | 2003-227902 A | 8/2003 |
| JP | 2003-279737 A | 10/2003 |
| JP | 2004-98303 A | 4/2004 |
| JP | 2004-115590 A | 4/2004 |
| JP | 2006-293334 A | 10/2006 |
| JP | 2007-41533 A | 2/2007 |
| JP | 2007-58162 A | 3/2007 |
| JP | 2007-69471 A | 3/2007 |
| JP | 2007-133384 A | 5/2007 |

OTHER PUBLICATIONS

Japanese Office Action issued on Jan. 22, 2013 in corresponding Japanese Patent Application No. 2008-196936 (English translation provided).

* cited by examiner

ANTIGLARE FILM, POLARIZING PLATE, AND IMAGE DISPLAY DEVICE

BACKGROUND OF THE INVENTION

1. Field of the Invention

The present invention relates to an antiglare film, a polarizing plate having the subject antiglare film and an image display device.

2. Description of the Related Art

In various liquid crystal display devices such as a liquid crystal display device (LCD), a plasma display panel (PDP), an electroluminescence display (ELD) and a cathode ray tube display device (CRT), an antiglare film having an antiglare hard coat layer laminated on a transparent plastic film substrate is disposed on the surface of a display for the purpose of preventing a lowering of contrast to be caused due to reflection of external light or reflection of an image by surface scattering.

In recent years, in liquid crystal televisions and so on, following a trend for prices to lower, image display devices having such an antiglare film mounted therein have widely diffused. Following this, an opportunity when the mounted antiglare film is exposed under various circumstances together with the image display device is increasing. In particular, such a liquid crystal television is handled in the same way as in a CRT having a glass-made surface, and as a result, danger that the surface of the liquid crystal display device is scared has increased. For that reason, the antiglare film which is disposed on the uppermost surface of the liquid crystal display device is being required to have high physical strength (for example, abrasion resistance, etc.) in addition to a high visibility improving effect which has hitherto been required.

In order to obtain high physical strength, there is proposed an antireflection film in which a hard coat layer having a film thickness of 10 μm or more is laminated on a cellulose acylate film by coating a curable composition containing a photocurable resin and an organic solvent thereon, drying and photocuring (see, JP-A-2003-227902).

Also, there is proposed an antiglare film having a high surface hardness, in which an antiglare layer having a film thickness of from 15 to 35 μm is laminated on a cellulose acylate film by coating a curable composition containing a resin particle having an average particle size of from 6 to 15 μm, a curable resin and an organic solvent thereon, drying and photocuring (see, JP-A-2007-041533).

Though the antiglare layer having an increased film thickness is effective for preventing a scar generated by a force which is applied vertically to the surface of a display screen, it was not effective against a scratch generated by a parallel force to the surface.

There is disclosed a method for applying a thin film containing a silica particle on a layer having fine recesses and projections on the surface thereof (see, JP-A-7-290652). However, according to this method, since the thin film layer contains a silica particle of 1 μm or more, there is a concern that surface scattering is strong so that when observed in a bright room, whitishness is strongly viewed.

There is disclosed an antiglare film in which a fine particle-containing curable resin layer containing an inorganic or organic fine particle and a fine particle-free clear curable resin layer are laminated in this order on a plastic film substrate (see, JP-A-10-325901). However, a further abrasion resistant effect of the surface was demanded.

Also, there is generally known an antiglare film in which an antiglare layer and a fluorine based binder-containing low refractive index layer are laminated in this order on a plastic film substrate (see, JP-A-11-305010). However, in general, the fluorine based binder is weak in cohesion, and therefore, in antiglare films having such a fluorine based binder layer laminated on the upper surface thereof, an improvement of the abrasion resistance was demanded.

SUMMARY OF THE INVENTION

The invention is aimed to solve the foregoing problems of the related art and attain the following objects. That is, an object of the invention is to provide an antiglare film which is excellent in abrasion resistance, excellent in antiglare properties and excellent in visibility in a bright room and which does not newly bring a problem such as wind unevenness thereinto. Another object of the invention is to provide a polarizing plate using such an antiglare film and an image display device using the subject polarizing plate, which is excellent in abrasion resistance and good in visibility.

That is, the present invention is as follows:

(1) An antiglare film comprising:

a transparent plastic film substrate;

an antiglare layer having fine recesses and projections on the surface thereof; and an abrasion resistant layer provided at an uppermost surface of the antiglare film, the abrasion resistant layer having an average film thickness of from 0.03 to 0.4 μm, wherein the abrasion resistant layer is formed from a curable composition containing at least following components (A), (B), and (C):

(A) an inorganic fine particle containing silicon oxide as a main component and having an average particle size of from 1 to 300 nm;

(B) an ionizing radiation-curable resin; and (C) a polymer thickener.

(2) The antiglare film as described in item (1) above, wherein a surface of the inorganic fine particle is subjected to a surface treatment with a compound represented by following formula (I):

$$(R^{10})_m\text{—Si}(X)_{4-m} \qquad (I)$$

wherein $R^{10}$ represents a substituted or unsubstituted alkyl group or a substituted or unsubstituted aryl group; X represents a hydroxyl group or a hydrolyzable group; and m represents an integer of from 1 to 3.

(3) The antiglare film as described in item (1) or (2) above, wherein the polymer thickener of the curable composition is a cellulose ester.

(4) The antiglare film as described in any of items (1) to (3) above, wherein the abrasion resistant layer does not substantially contain a fluorine based binder.

(5) The antiglare film as described in any of items (1) to (4) above, wherein a refractive index of the abrasion resistant layer is lower than a refractive index of the antiglare layer.

(6) The antiglare film as described in any of items (1) to (5) above, wherein the antiglare layer contains at least one translucent resin and at least one translucent particle.

(7) The antiglare film as described in any of items (1) to (6) above, wherein the translucent particle of the antiglare layer has an average particle size of from 5.5 to 15 μm, and the antiglare layer has an average film thickness of from 8 to 40 μm.

(8) A polarizing plate, comprising:
a polarizing film; and
two protective films,
wherein one of said two protective films is the antiglare film as described in any of items (1) to (7) above.

(9) A polarizing plate, comprising:
a polarizing film; and
two protective films,
wherein one of said two protective films is the antiglare film as described in any of items (1) to (7) above; and
the other one of said two protective films is an optical compensating film with optical anisotropy as the other of the polarizing film.

(10) An image display device, comprising:
an image display; and
the antiglare film as described in any of items (1) to (7) provided at a surface of the image display.

DETAILED DESCRIPTION OF THE INVENTION

Figure 1:
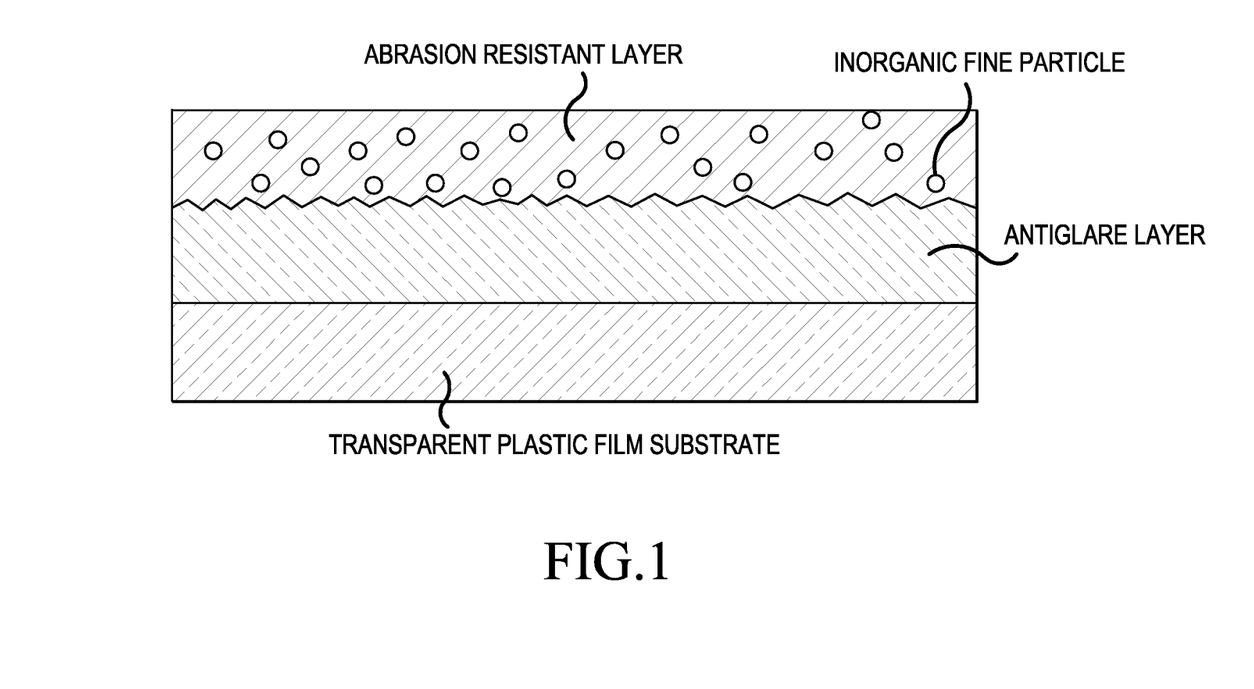
FIG. 1 An embodiment of the invention showing an antiglare film with abrasion resistant layer containing inorganic fine particle, antiglare layer and transparent plastic film substrate.
Figure 2:
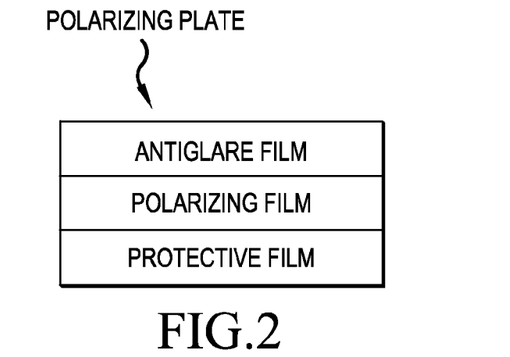
FIG. 2 An embodiment of the invention showing a polarizing plate comprised of an antiglare film, polarizing film and protective film.
Figure 3:
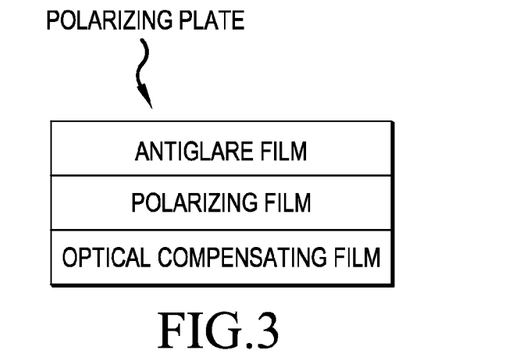
FIG. 3 An embodiment of the invention showing a polarizing plate comprised of an antiglare film, polarizing film and an optical compensating film.
Figure 4:
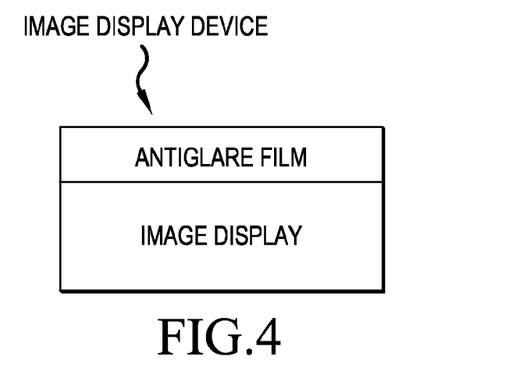
FIG. 4 An embodiment of the invention showing an image display device comprised of an antiglare film and image display.

The invention is hereunder described in more detail. In this specification, in the case where a numerical value represents a physical property value, a characteristic value, etc., the terms "from (numerical value 1) to (numerical value 2)" mean "(numerical value 1) or more and not more than (numerical value 2)". Also, in this specification, the term "(meth)acrylate" means "at least one of acrylate and methacrylate". The same is also applicable to the terms "(meth)acrylic acid" or the like.

(Layer Configuration of Antiglare Film)

The antiglare film of the invention has an antiglare layer and an abrasion resistant layer on a transparent plastic film, with the abrasion resistant layer being located at the uppermost surface thereof, and the abrasion resistant layer is made of a curable composition containing the following components (A), (B) and (C):

(A) a silicon oxide fine particle having an average particle size of from 1 to 300 nm;
(B) an ionizing radiation-curable resin; and
(C) a polymer thickener.

As to the layer configuration, the antiglare film of the invention has at least one antiglare layer and an abrasion resistant layer at the uppermost surface thereof. The antiglare layer may be of a configuration of plural layers. Also, other functional layer may be laminated between the substrate film and the antiglare layer, and/or between the antiglare layer and the abrasion resistant layer. Examples of such other functional layer include a hard coat layer, an antistatic layer and an interference unevenness preventing layer.

The abrasion-resistance layer may also serve as a function of other layer. Examples of such a layer include an antireflection layer, a low refractive index layer, an antifouling layer and an antistatic layer.

In the invention, it is preferable from the standpoint of a low refractive index that the abrasion resistant layer also serves as a low refractive index layer (antireflection layer). In that case, a configuration including a high refractive index layer, or a middle refractive index layer and a high refractive index layer between the abrasion resistant layer and the antiglare layer is also a preferred embodiment.

Examples of the preferred layer configuration of the antiglare film of the invention are described below. In the following configurations, the substrate film refers to a support which is configured of a film.

Substrate film/antiglare layer/abrasion resistant layer

Substrate film/antistatic layer/antiglare layer/abrasion resistant layer

Substrate film/antiglare layer/abrasion resistant layer (also serving as a low refractive index layer)

Substrate film/antiglare layer/antistatic layer/abrasion resistant layer

Substrate film/hard coat layer/antiglare layer/abrasion resistant layer

Substrate film/hard coat layer/antiglare layer/antistatic layer/abrasion resistant layer Substrate film/hard coat layer/antistatic layer/antiglare layer/abrasion resistant layer Substrate film/antiglare layer/high refractive index layer/abrasion resistant layer Substrate film/antiglare layer/middle refractive index layer/high refractive index layer/abrasion resistant layer Antistatic layer/substrate film/antiglare layer/middle refractive layer/high refractive index layer/abrasion resistant layer Substrate film/antistatic layer/antiglare layer/middle refractive layer/high refractive index/abrasion resistant layer Antistatic layer/substrate film/antiglare layer/high refractive index layer/low refractive index layer/high refractive index layer/abrasion resistant layer (Abrasion Resistant Layer)

An average film thickness of the abrasion resistant layer is preferably from 0.03 µm to 0.4 µm, more preferably from 0.05 µm to 0.3 µm, and further preferably from 0.05 µm to 0.2 µm. When the film thickness of the abrasion resistant layer falls within this range, sufficient abrasion resistance can be obtained while preventing wind unevenness.

A refractive index of the abrasion resistant layer is preferably from 1.40 to 1.52, more preferably from 1.42 to 1.52, and further preferably from 1.45 to 1.51. When the refractive index of the abrasion resistant layer falls within this range, the abrasion resistant layer can also serve as a function of a low reflectance layer, can control the reflectance and can further inhibit reflection of external light. Also, by controlling a lower limit of the refractive index to this range, even when the abrasion resistant layer peels, the scar is hardly conspicuous.

A difference of the refractive index of the abrasion resistant layer from a refractive index of an adjacent lower layer is preferably from 0.02 to 0.10, with the refractive index of the abrasion resistant layer being kept within the foregoing range. In the case where a difference in refractive index is present, by regulating the film thickness of the abrasion resistant layer at from 0.08 µm to 0.12 µm, the reflectance of the surface can be further controlled by utilizing an interference effect of light.

Also, by controlling an upper limit of the difference in refractive index, even when the abrasion resistant layer peels, the scar is hardly conspicuous.

The abrasion resistant layer of the invention is made of a curable composition containing at least the following components (A), (B) and (C) (this curable composition is a composition for forming an abrasion resistant layer; hereinafter referred to as "curable composition of the invention"):

(A) an inorganic fine particle containing, as a main component, silicon oxide having an average particle size of from 1 to 300 nm;

(B) an ionizing radiation-curable resin; and (C) a polymer thickener.

Each of the components of the curable composition of the invention is hereunder described in detail.

(Inorganic Fine Particle Containing, as a Main Component, Silicon Oxide of Abrasion Resistant Layer)

The curable composition of the invention contains an inorganic fine particle containing, as a main component, silicon oxide having an average particle size of from 1 to 300 nm as the component (A). In the invention, the terms "inorganic fine particle containing, as a main component, silicon oxide" mean an inorganic fine particle containing 50% by weight or more of silicon oxide. The inorganic fine particle contains silicon oxide in an amount of preferably 70% by weight or more, and especially preferably 90% by weight or more.

The content of the inorganic fine particle is preferably from 5 to 80% by weight, more preferably from 10 to 70% by weight, and further preferably from 20 to 50% by weight relative to the solids content of the abrasion resistant layer.

The inorganic fine particle of the invention can be used by modifying the surface and dispersing in an organic solvent. From the viewpoints of compatibility with other components and dispersibility, a dispersion medium is preferably an organic solvent. Examples of the organic solvent which can be used include alcohols such as methanol, ethanol, isopropanol, butanol and octanol; ketones such as acetone, methyl ethyl ketone, methyl isobutyl ketone and cyclohexanone; esters such as ethyl acetate, butyl acetate, ethyl lactate, γ-butyrolactone, propylene glycol monomethyl ether acetate and propylene glycol monoethyl ether acetate; ethers such as ethylene glycol monomethyl ether and diethylene glycol monobutyl ether; aromatic hydrocarbons such as benzene, toluene and xylene; and amides such as dimethylformamide, dimethylacetamide and N-methylpyrrolidone. Of these, methanol, isopropanol, butanol, methyl ethyl ketone, methyl isobutyl ketone, ethyl acetate, butyl acetate, toluene and xylene are preferable.

A number average particle size of the inorganic fine particle of the invention is from 1 nm to 300 nm, preferably from 3 nm to 150 nm, and most preferably from 10 nm to 100 nm. When the number average particle size of the inorganic fine particle falls within the foregoing range, it is possible to contemplate to make abrasion resistance and firmness of black color compatible with each other. The number average particle size can be determined by observing the inorganic fine particle by a transmission electron microscope and averaging 500 particles as a sphere-corresponding value. So far as the number average particle size is concerned, a particle with monodispersibility is preferable.

Also, various surfactants or amines may be added for the purpose of improving the dispersibility of the particle.

In the invention, it is preferred to use inorganic fine particles having at least two kinds of a different number average particle size from each other. It is more preferred to use inorganic fine particle having two kinds of a number average particle size of from 5 nm to 20 nm and a number average particle size of from 20 nm to 100 nm. At that time, it is preferable that the inorganic fine particle having a number average particle size of from 5 nm to 20 nm is the main component (in an amount of 51% by mass or more and not more than 90% by mass, preferably 60% by mass or more and not more than 90% by mass, and more preferably 70% by mass or more and not more than 90% by mass).

Examples of products which are commercially available as a silicon oxide fine particle dispersion solution (for example, a silica particle) include, as colloidal silica, METHANOL SILICA SOL, MA-ST-MS, IPA-ST, IPA-ST-MS, IPA-ST-L, IPA-ST-ZL, IPA-ST-UP, EG-ST, NPC-ST-30, MEK-ST, MEK-ST-L, MIBK-ST-, NBA-ST, XBA-ST, DMAC-ST, ST-UP, ST-OUP, ST-20, ST-40, ST-C, ST-N, ST-O, ST-50, ST-OL, etc., all of which are manufactured by Nissan Chemical Industries, Ltd.; and hollow silica, manufactured by Catalysts & Chemicals Industries Co., Ltd. Also, examples of powdered silica include AEROSIL 130, AEROSIL 300, AEROSIL 380, AEROSIL TT600 and AEROSIL OX50, all of which are manufactured by Nippon Aerosil Co., Ltd.; SILDEX H31, SILDEX H32, SILDEX H51, SILDEX H52, SILDEX H121 and SILDEX H122, all of which are manufactured by Asahi Glass Co., Ltd.; E220A and E220, all of which are manufactured by Nippon Silica Industrial Co., Ltd.; SYLYSIA 470, manufactured by Fuji Silysia Chemical Ltd.; and SG FLAKE, manufactured by Nippon Sheet Glass Co., Ltd.

The shape of the inorganic fine particle is a spherical, hollow, porous, rod-like, tabular, fibrous or amorphous shape, and preferably a spherical or hollow shape. In order to lower the refractive index of the abrasion resistant layer, it is also preferred to use a hollow silica fine particle. A specific surface area (measured according to the BET specific surface area measurement using nitrogen) of the inorganic fine particle is preferably from 10 to 1,000 m$^2$/g, more preferably from 30 to 150 m$^2$/g, and further preferably from 50 to 100 m$^2$/g.

(Surface Treating Agent)

A surface treating agent which can be used for the surface treatment of the inorganic fine particle of the invention is hereunder described in detail.

$$(R^{10})_m\text{—Si}(X)_{4-m} \qquad (I)$$

In the formula (I), $R^{10}$ represents a substituted or unsubstituted alkyl group or a substituted or unsubstituted aryl group. Preferable examples of the alkyl group include a methyl group, an ethyl group, a propyl group, an isopropyl group, a hexyl group, a t-butyl group, a sec-butyl group, a hexyl group, a decyl group and a hexadecyl group. The alkyl group preferably has carbon atoms of from 1 to 30, more preferably from 1 to 16, and especially preferably from 1 to 6. Examples of the aryl group include a phenyl group and a naphthyl group, with a phenyl group being preferable.

X represents a hydroxyl group or a hydrolyzable group. Examples of the hydrolyzable group include an alkoxy group (preferably an alkoxy group having from 1 to 5 carbon atoms, for example, a methoxy group, an ethoxy group, etc.), a halogen atom (for example, Cl, Br, I, etc.) and an $R^2COO$ group ($R^2$ is preferably a hydrogen atom or an alkyl group having from 1 to 5 carbon atoms; and examples thereof include a $CH_3COO$ group and a $C_2H_5COO$ group). Of these, an alkoxy group is preferable, and a methoxy group or an ethoxy group is especially preferable.

$\underline{m}$ represents an integer of from 1 to 3. When plural $R^{10}$s or Xs are present, the plural $R^{10}$s or Xs may be the same as or different from each other. $\underline{m}$ is preferably 1 or 2, and especially preferably 1.

Also, in the case where X represents a hydrolyzable group, compounds represented by the following formula are preferable, too.

(R$^{10}$)$_3$—Si—(X)—Si—(R$^{10}$)$_3$

Here, R$^{10}$ is synonymous with the foregoing R$^{10}$; and X represents a hydrolyzable group. Examples of X include —O— and —NH—.

Though a substituent which is included in R$^{10}$ is not particularly limited, examples thereof include a halogen atom (for example, a fluorine atom, a chlorine atom, a bromine atom, etc.), a hydroxyl group, a mercapto group, a carboxyl group, an epoxy group, an alkyl group (for example, a methyl group, an ethyl group, an isopropyl group, a propyl group, a t-butyl group, etc.), an aryl group (for example, a phenyl group, a naphthyl group, etc.), an aromatic heterocyclic group (for example, a furyl group, a pyrazolyl group, a pyridyl group, etc.), an alkoxy group (for example, a methoxy group, an ethoxy group, an isopropoxy group, a hexyloxy group, etc.), an aryloxy group (for example, a phenoxy group, etc.), an alkylthio group (for example, a methylthio group, an ethylthio group, etc.), an arylthio group (for example, a phenylthio group, etc.), an alkenyl group (for example, a vinyl group, a 1-propenyl group, etc.), an acyloxy group (for example, an acetoxy group, an acryloyloxy group, a methacryloyloxy group, etc.), an alkoxycarbonyl group (for example, a methoxycarbonyl group, an ethoxycarbonyl group, etc.), an aryloxycarbonyl group (for example, a phenoxycarbonyl group, etc.), a carbamoyl group (for example, a carbamoyl group, an N-methylcarbamoyl group, an N,N-dimethylcarbamoyl group, an N-methyl-N-octylcarbamoyl group, etc.) and an acylamino group (for example, an acetylamino group, a benzoylamino group, an acrylamino group, a methacrylamino group, etc.). Such a substituent may be further substituted. In this specification, even a group which substitutes the hydrogen atom is a single atom is dealt as the substituent for the sake of convenience.

In the case where plural R$^{10}$s are present, it is preferable that at least one of them is a substituted alkyl group or a substituted aryl group. Above all, it is preferable that the substituted alkyl group or substituted aryl group further has a vinyl polymerizable group. In that case, the compound represented by the formula (I) can be represented as an organosilane compound having a vinyl polymerizable substituent represented by the following formula (II).

(II)

In the formula (II), R$^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. R$^1$ is preferably a hydrogen atom, a methyl group, a methoxy group, a methoxycarbonyl group, a cyano group, a fluorine atom or a chlorine atom; more preferably a hydrogen atom, a methyl group, a methoxycarbonyl group, a fluorine atom or a chlorine atom; and especially preferably a hydrogen atom or a methyl group.

Y represents a single bond, an ester group, an amide group, an ether group or a urea group. Y is preferably a single bond, an ester group or an amide group; more preferably a single bond or an ester group; and especially preferably an ester group.

L represents a divalent connecting chain, and specifically a substituted or unsubstituted alkylene group, a substituted or unsubstituted arylene group, a substituted or unsubstituted alkylene group having a connecting group (for example, an ether group, an ester group, an amide group, etc.) therein or a substituted or unsubstituted arylene group having a connecting group therein. Of these, a substituted or unsubstituted alkylene group having from 2 to 10 carbon atoms, a substituted or unsubstituted arylene group having from 6 to 20 carbon atoms and an alkylene group having a connecting group therein and having from 3 to 10 carbon atoms are preferable; an unsubstituted alkylene group, an unsubstituted arylene group and an alkylene group having an ether connecting group or an ester connecting group therein are more preferable; and an unsubstituted alkylene group and an alkylene group having an ether connecting group or an ester connecting group therein are especially preferable. Examples of the substituent include a halogen, a hydroxyl group, a mercapto group, a carboxyl group, an epoxy group, an alkyl group and an aryl group. Such a substituent may be further substituted.

n represents 0 or 1. When plural Xs are present, the plural Xs may be the same as or different from each other. n is preferably 0.

R$^{10}$ is synonymous with R$^{10}$ in the formula (I). R$^{10}$ is preferably a substituted or unsubstituted alkyl group or an unsubstituted aryl group, and more preferably an unsubstituted alkyl group or an unsubstituted aryl group.

X is synonymous with X in the formula (I). X is preferably a halogen, a hydroxyl group or an unsubstituted alkoxy group, more preferably chlorine, a hydroxyl group or an unsubstituted alkoxy group having from 1 to 5 carbon atoms, further preferably a hydroxyl group or an alkoxy group having from 1 to 3 carbon atoms, and especially preferably a methoxy group.

The compound represented by the formula (I) may be used in combinations of two or more kinds thereof. Specific examples of the compound represented by the formula (I) will be given below, but it should not be construed that the invention is limited thereto.

M-1

M-2

M-3

M-4

Also, disiloxane based or disilazane based compounds can be used as the surface treating agent. Examples thereof include hexamethyldisiloxane, 1,3-dibutyltetramethyldisiloxane, 1,3-diphenyltetramethyldisiloxane, 1,3-divinyltetramethyldisiloxane, hexaethyldisiloxane, 3-glycidoxypropylpentamethyldisiloxane, hexamethyldisilazane and hexaethyldisilazane.

Of these specific examples, (M-1), (M-2) and the like are especially preferable. Also, Compounds A, B and C disclosed in the Referential Examples of Japanese Patent No. 3474330 are excellent in dispersion stability and preferable. In the invention, though the use amount of the organosilane compound represented by the formula (I) is not particularly limited, it is preferably from 1% by mass to 300% by mass, more preferably from 3% by mass to 100% by mass, and most preferably from 5% by mass to 50% by mass relative to the inorganic fine particle. The use amount of the organosilane compound represented by the formula (I) is preferably from 1 to 300% by mole, more preferably from 5 to 300% by mole, and most preferably from 10 to 200% by mole relative to the normality concentration (formol) on the basis of a hydroxyl group on the surface of an inorganic oxide. When the use amount of the organosilane compound falls within the foregoing range, the effect for stabilizing a dispersion solution is sufficiently obtained, and the film strength at the time of forming a coating film also increases. It is also preferable that the organosilane compound is used in combinations of plural kinds thereof. Plural kinds of the organosilane compound can be used at the same time or can be allowed to react while deviating the addition time. Also, the addition of plural kinds of compounds after converting into a partial condensate in advance is preferable because the reaction control is easy.

(Ionizing Radiation Curable Resin)

The curable composition of the invention contains an ionizing radiation curable resin as the component (B). The ionizing radiation curable resin will be cured and serve as a binder of the abrasion resistant layer of the invention.

(Binder)

The binder of the abrasion resistant layer of the invention can be formed by a crosslinking reaction or a polymerization reaction of the ionizing radiation curable resin (B) with ionizing radiations.

The curable composition of the invention can be formed by coating, as the ionizing radiation curable resin, a composition containing a polyfunctional monomer or a polyfunctional oligomer on a transparent substrate film and subjecting the polyfunctional monomer or polyfunctional oligomer having a polymerizable group to a crosslinking reaction or a polymerization reaction.

Examples of the polymerizable group include unsaturated polymerizable functional groups such as a (meth)acryloyl group, a vinyl group, a styryl group and an allyl group. Of these, a (meth)acryloyl group is preferable.

It is preferable that the curable composition of the invention does not contain a component which will serve as a fluorine based binder. The fluorine based binder is generally low in a cohesive force and lowers the abrasion resistance.

Specific examples of the polyfunctional monomer having a polymerizable group include (meth)acrylic diesters of an alkylene glycol, for example, neopentyl glycol acrylate, 1,6-hexanediol (meth)acrylate, propylene glycol di(meth)acrylate, etc.;

(meth)acrylic diesters of a polyoxyalkylene glycol, for example, triethylene glycol di(meth)acrylate, dipropylene glycol di(meth)acrylate, polyethylene glycol di(meth)acrylate, polypropylene glycol di(meth)acrylate, etc.;

(meth)acrylic diesters of a polyhydric alcohol, for example, pentaerythritol di(meth)acrylate, etc.; and (meth)acrylic diesters of an ethylene oxide or propylene oxide adduct, for example, 2,2-bis {4-(acryloxy•diethoxy)phenyl}propane, 2,2-bis {4-(acryloxy•polypropoxy)phenyl}propane, etc.

Furthermore, epoxy (meth)acrylates, urethane (meth)acrylates and polyester (meth)acrylates are also preferably used as the photopolymerizable polyfunctional monomer.

Of the foregoing, esters of a polyhydric alcohol and (meth)acrylic acid are preferable; and polyfunctional monomers having three or more (meth)acryloyl groups in one molecule thereof are more preferable.

Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate and tripentaerythritol hexatriacrylate.

In this specification, the terms "(meth)acrylate", "(meth)acrylic acid" and "(meth)acryloyl" mean "acrylate or methacrylate", "acrylic acid or methacrylic acid" and "acryloyl or methacryloyl", respectively.

The polyfunctional monomer may be used in combinations of two or more kinds thereof.

The polymerization of such an ethylenically unsaturated group-containing monomer can be carried out in the presence of a photopolymerization initiator upon irradiation with ionizing radiations. The photopolymerization initiator is preferably a photo radical polymerization initiator or a photo cationic polymerization initiator, and especially preferably a photo radical polymerization initiator.

The content of the ionizing radiation curable resin is preferably from 10 to 85% by weight, more preferably from 23 to 89% by weight, and further preferably from 45 to 75% by weight relative to the solids content of the abrasion resistant layer.

(Photopolymerization Initiator)

Examples of the photo radical polymerization initiator include acetophenones, benzoins, benzophenones, phosphine oxides, ketals, anthraquinones, thioxanthones, azo compounds, peroxides (for example, those disclosed in JP-A-2001-139663, etc.), 2,3-dialkyldione compounds, disulfide compounds, fluoroamine compounds, aromatic sulfoniums, lophine dimers, onium salts, borate salts, active esters, active halogens, inorganic complexes and coumarins.

Examples of the acetophenones include 2,2-dimethoxyacetophenone, 2,2-diethoxyacetophenone, p-dimethylacetophenone, 1-hydroxydimethyl phenyl ketone, 1-hydroxydimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)butanone, 4-phenoxydichloroacetophenone and 4-t-butyldichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether and benzoin isopropyl ether.

Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone) and 3,3',4,4'-tetra(t-butylperoxycarbonyl)benzophenone.

Examples of the borate salts include organic boric acid salts disclosed in Japanese Patent No. 2764769, JP-A-2002-116539 and Kunz and Martin, *Rad Tech '98. Proceeding, April*, pages 19 to 22 (1998), Chicago. Example thereof include compounds disclosed in paragraphs [0022] to [0027] of the foregoing JP-A-2002-116539.

Also, specific examples of other organoboron compounds include organoboron transition metal-coordinated complexes disclosed in JP-A-6-348011, JP-A-7-128785, JP-A-7-140589, JP-A-7-306527 and JP-A-7-292014. Specific examples thereof include ion complexes with a cationic dye.

Examples of the phosphine oxides include 2,4,6-trimethylbenzoyl diphenylphosphine oxide.

Examples of the active esters include 1,2-octanedione, 1-[4-(phenylthio)phenyl]-,2-(O-benzoyloxime), sulfonic acid esters and cyclic active ester compounds.

Specifically, Compounds 1 to 21 disclosed in the working examples of JP-A-2000-80068 are especially preferable.

Also, examples of the onium salts include aromatic diazonium salts, aromatic iodonium salts and aromatic sulfonium salts.

Specific examples of the active halogens include compounds described in Wakabayashi, et al., *Bull Chem. Soc. Japan*, Vol. 42, page 2924 (1969), U.S. Pat. No. 3,905,815, JP-A-5-27830 and M. P. Hutt, *Journal of Heterocyclic Chem-*

*istry*, Vol. 1 (No. 3), 1970. In particular, there are exemplified oxazole compounds and s-triazine compounds each having a trihalomethyl group substituted thereon.

More suitably, there are exemplified s-triazine derivatives in which at least one mono-, di- or trihalogen-substituted methyl group is bound to an s-triazine ring.

Such an initiator may be used singly or in admixture.

Preferred examples of commercially available photo radical polymerization initiators include KAYACURE Series, manufactured by Nippon Kayaku Co., Ltd. (for example, DETX-S, BP-100, BDMK, CTX, BMS, 2-FAQ, ABQ, CPTX, EPD, ITX, QTX, BTC, MCA, etc.), IRGACURE Series, manufactured by Ciba Specialty Chemicals (for example, 651, 184, 500, 819, 907, 369, 1173, 1870, 2959, 4265, 4263, etc.), ESACURE Series, manufactured by Sartmer Company Inc. (for example, KIP100F, KB1, EB3, BP, X33, KT046, KT37, KIP150, TZT, etc.) and combinations thereof.

The photopolymerization initiator is preferably used in an amount in the range of from 0.1 to 15 parts by mass, and more preferably used in an amount in the range of from 1 to 10 parts by mass based on 100 parts by mass of the ionizing radiation curable resin.

(Photosensitizer)

In addition to the foregoing photopolymerization initiator, a photosensitizer may be used. Specific examples of the photosensitizer include n-butylamine, triethylamine, tri-n-butyl phosphine, Michler's ketone and thioxanthone.

Furthermore, at least one auxiliary such as azide compounds, thiourea compounds and mercapto compounds may be combined and used.

Examples of commercially available photosensitizers include KAYACURE Series, manufactured by Nippon Kayaku Co., Ltd. (for example, DMBI, EPA, etc.).

The content of the binder including the curable compound, the photopolymerization initiator and the photosensitizer is preferably from 30 to 95% by weight, more preferably from 40 to 90% by weight, and especially preferably from 50 to 80% by weight relative to the solids content of the curable composition.

(Polymer Thickener)

The curable composition of the invention contains a polymer thickener (preferably an organic polymer thickener) as the component (C). The "polymer thickener" as referred to herein means a material capable of increasing the viscosity of a solution upon addition of the same. A degree of the increase of the viscosity of the coating solution by the addition of the polymer thickener is preferably from 0.05 to 50 cP, more preferably from 0.10 to 20 cP, and most preferably from 0.10 to 10 cP.

In the invention, a polymer thickener is preferably used. Above all, cellulose acetate, cellulose propionate and cellulose acetate butyrate, all of which are a cellulose ester, are preferable because they have an effect for preventing cohesion of the silicon oxide fine particle in addition to a thickening effect of a coating solution. Of these, cellulose acetate butyrate is especially preferable.

As the polymer thickener of the invention, at least one polymer thickener which is selected among the following group A is preferably used.

(Group A)
Poly-ε-caprolactone
Poly-ε-caprolactone diol
Poly-ε-caprolactone triol
Polyvinyl acetate
Poly(ethylene adipate)
Poly(1,4-butylene adipate)
Poly(1,4-butylene glutarate)
Poly(1,4-butylene succinate)
Poly(1,4-butylene terephthalate)
Poly(ethylene terephthalate)
Poly(2-methyl-1,3-propylene adipate)
Poly(2-methyl-1,3-propylene glutarate)
Poly(neopentyl glycol adipate)
Poly(neopentyl glycol sebacate)
Poly(1,3-propylene adipate)
Poly(1,3-propylene glutarate)
Polyvinyl butyral
Polyvinyl formal
Polyvinyl acetal
Polyvinyl propanal
Polyvinyl hexanal
Polyvinyl pyrrolidone
Polyacrylic esters
Polymethacrylic esters
Cellulose acetate
Cellulose propionate
Cellulose acetate butyrate A molecular weight of the polymer thickener is preferably from 3,000 to 400,000, more preferably from 4,000 to 300,000, and especially preferably from 5,000 to 200,000 in terms of a number average molecular weight.

The addition amount of the polymer thickener is preferably from 0.5 to 10% by weight, more preferably from 1 to 7% by weight, and further preferably from 2 to 5% by weight relative to the solids content of the abrasion resistant layer.

(Antifouling Agent)

An embodiment in which the abrasion resistant layer of the invention has antifouling properties in addition to the scar preventing effect is also preferable. For that reason, such a function can be added by adding a polysiloxane based or fluorine based antifouling agent in the curable composition of the invention. Above all, in the invention, a polysiloxane based antifouling agent is preferable, and an unsaturated double bonding group-containing silicon based antifouling agent is especially preferable.

The addition amount of the antifouling agent is preferably from 0.01 to 20% by weight, more preferably from 0.05 to 10% by weight, and especially preferably from 0.1 to 5% by weight relative to the total solids content of the abrasion resistant layer.

Examples of the unsaturated double bonding group-containing polysiloxane based antifouling agent include siloxane group-containing monomers obtained by a reaction of polydimethylsiloxane and (meth)acrylic acid, etc. Specific examples of (meth)acrylate-terminated siloxane compounds include X-22-164A, X-22-164B, X-22-164C, X-22-2404, X-22-174D, X-22-8201 and X-22-2426 (all of which are manufactured by Shin-Etsu Chemical Co., Ltd.).

(Organic Solvent of Abrasion Resistant Layer)

It is preferable that the curable composition contains an organic solvent. Examples of the organic solvent which can be used from the viewpoints of compatibility with other components and dispersibility include alcohols such as methanol, ethanol, isopropanol, butanol and octanol; ketones such as acetone, methyl ethyl ketone, methyl isobutyl ketone and cyclohexanone; esters such as ethyl acetate, butyl acetate, ethyl lactate, γ-butyrolactone, propylene glycol monomethyl ether acetate and propylene glycol monoethyl ether acetate; ethers such as ethylene glycol monomethyl ether and diethylene glycol monobutyl ether; aromatic hydrocarbons such as benzene, toluene and xylene; and amides such as dimethylformamide, dimethylacetamide and N-methylpyrrolidone.

Of these, methanol, isopropanol, butanol, methyl ethyl ketone, methyl isobutyl ketone, ethyl acetate, butyl acetate, toluene and xylene are preferable.

The solids concentration of the curable composition is preferably from 0.5 to 30% by weight, more preferably from 1 to 20% by weight, and especially preferably from 2 to 10% by weight.

(Configuration of Antiglare Layer)

Though the antiglare layer of the invention may be any layer so far as it has a shape of fine recesses and projections on the surface thereof, it preferably contains at least one translucent resin and at least one translucent particle.

The antiglare layer of the invention contains a translucent particle having an average particle size of from 2 μm to 20 μm. The translucent particle preferably has an average particle size of from 5 μm to 15 μm, and more preferably has an average particle size of from 5.5 μm to 15 μm.

Though the average film thickness of the antiglare layer is not particularly limited, it is preferably from 8 to 40 μm. The average film thickness of the antiglare layer is more preferably from 8 to 40 μm from the standpoints of visibility (firmness of black color) and scar preventing properties against a force vertically applied to the film.

As an embodiment of the antiglare layer of the invention, a layer obtained by coating a coating solution containing a translucent particle having an average particle size of from 5.5 μm to 15 μm, a matrix forming component (for example, a monomer for binder, etc.) and an organic solvent, drying and curing is preferable.

The coating solution for forming an antiglare layer contains, for example, a monomer for binder capable of chiefly forming a matrix which will be a raw material of a translucent polymer to be formed upon irradiation with ionizing radiations or the like, a translucent particle having the foregoing specified particle size, a polymerization initiator, and preferably a polymer compound for regulating the viscosity of the coating solution, an inorganic finely particulate filler for curl reduction, refractive index regulation or the like, a coating auxiliary and so on.

The thickness of the antiglare layer is preferably from 8 μm to 40 μm, more preferably from 10 μm to 35 μm, and most preferably from 11 μm to 25 μm. In the case where the thickness of the antiglare layer is not less than 8 μm, when a translucent particle as described later is used, the surface recesses and projections do not become excessively large, and firmness of black color is not deteriorated; whereas in the case where the thickness of the antiglare layer is less than 40 μm, the surface recesses and projections do not become small, and the antiglare properties are sufficient.

(Translucent Particle of Antiglare Layer)

The average particle size of the particle is preferably from 5.5 μm to 15 μm, more preferably from 6.0 μm to 12 μm, and further preferably from 6.0 μm to 10 μm.

In the invention, though the antiglare layer can be made of one kind of a translucent particle, it is more preferable that the antiglare layer is made of two kinds of particles having the same average particle size and having a different refractive index from each other. In the invention, the antiglare layer is formed by dispersing the translucent particle in a coating solution for forming an antiglare layer, coating, drying and curing. As to the average particle size of the translucent particle, in all of the case where two or more particles exist adjacent in the coating film and the case where they exist independently, the average particle size refers to a primary particle size. However, in the case where a cohesive inorganic particle having a primary particle size of about 0.1 μm is dispersed as a secondary particle in a size which is satisfied with the particle size of the invention in a coating solution and then coated, the average particle size refers to a size of the secondary particle.

In the invention, when the average particle size of the particle falls within the foregoing range, the stability in the surface shape after storing the coating solution is excellent. Also, the firmness of black color of the screen is excellent, a rough feel is low because of adequate antiglare properties, and a lowering in the frontal contrast is small.

In the invention, in order to attain excellent antiglare properties and firmness of black color at the same time, in addition to the foregoing, a ratio ($\phi/t$) of an average particle size ($\phi$) of the translucent particle to a film thickness (t) is important. $\phi/t$ is preferably from 0.3 to 0.7, more preferably from 0.35 to 0.65, and especially preferably from 0.4 to 0.6. When $\phi/t$ is not excessively high, the surface roughness is not strong so that the appearance is not deteriorated, whereas when it is not excessively low, the firmness of black color is not deteriorated.

In the invention, in order to obtain necessary internal scattering properties, it is necessary to regulate a difference in refractive index between the particle and the matrix. A difference in refractive index between at least one particle and the matrix is preferably from 0.02 to 0.5, more preferably from 0.02 to 0.20, and most preferably from 0.03 to 0.15. In the case of containing two kinds of particles, a difference in refractive index between the particles is preferably from 0.02 to 0.20, and more preferably from 0.02 to 0.10.

Also, in the case of containing two kinds of particles, it is also preferred to take an embodiment in which one of the particles has a refractive index lower than that of the matrix, and the other particle has a refractive index higher than that of the matrix. For example, the refractive index of the particle having a high refractive index is preferably from 1.54 to 1.70, and more preferably from 1.55 to 1.60; and the refractive index of the particle having a low refractive index is preferably from 1.44 to 1.53, and more preferably from 1.46 to 1.52. In view of the fact that there is a difference in refractive index between the two kinds of particles, it becomes easy to control the internal scattering and the surface shape. Also, the stability of the surface shape after storing the coating solution is enhanced.

Though the reason why the surface shape before and after storing the coating solution is enhanced has not been elucidated yet, the following assumption may be made. That is, in the case of using particles having a different refractive index from each other, since the surface state is different, the cohesion and dispersion behavior in the matrix is also different. In view the fact that a particle which easily causes cohesion and a particle which has a slightly different particle size from the former and which hardly causes cohesion coexist, stabilization of the surface state of the antiglare layer is realized without the progress of the particle cohesion during the storage of the coating solution. For example, in the case where a general-purpose polyfunctional acrylate compound is used for the matrix forming binder, when a resin particle having a refractive index of the translucent particle of 1.54 or more is used, the tendency of cohesion of the particle is strong, and a change in the surface shape of a coated material becomes easily large with a lapse of time. In that case, by mixing a particle having a different particle size, the large growth in size of a cohered material can be controlled, and stabilization of the surface shape is realized. Also, by further mixing a particle having low cohesion properties itself and having a refractive index of not more than 1.53, the growth of a cohered material can be more effectively controlled, and stabilization of the surface state is achieved.

The addition amount of the particle is preferably from 1 to 60% by mass, more preferably from 2 to 50% by mass, and most preferably from 3 to 40% by mass in the total solids content in an antiglare layer. When the addition amount of the particle falls within this range, an excellent effect for decreasing a fluctuation of the surface form of a coating film following the change of the coating solution with a lapse of time is revealed.

The particle can be chosen among particles as described below depending upon desired refractive index and average particle size.

In the invention, a resin particle and/or an inorganic fine particle is useful as the translucent particle.

As specific examples of the resin particle, there are favorably exemplified resin particles, for example, a crosslinked polymethyl methacrylate particle, a crosslinked methyl methacrylate-styrene copolymer particle, a crosslinked polystyrene particle, a crosslinked methyl methacrylate-methyl acrylate copolymer particle, a crosslinked acrylate-styrene copolymer particle, a melamine•formamide resin particle, a benzoguanamine•formamide resin particle, etc. Of these, a crosslinked styrene particle, a crosslinked polymethyl methacrylate particle, a crosslinked methyl methacrylate-styrene copolymer particle and so on are preferable. Furthermore, so-called surface-modified particles obtained by chemically bonding a compound containing a fluorine atom, a silicon atom, a carboxyl group, a hydroxyl group, an amino group, a sulfonic acid group, a phosphoric acid group, etc. on the surface of such a resin particle; and particles obtained by bonding an inorganic fine particle with a nano size, such as silica and zirconia, on the surface thereof are also preferably exemplified. Also, an inorganic fine particle can be used as the translucent particle. Specific examples of the inorganic fine particle include a silica particle and an alumina particle. Of these, a silica particle is especially preferably used.

In the case of making the matrix have a refractive index of not more than 1.54, and especially preferably not more than 1.53, in the invention, a crosslinked polymethyl methacrylate particle, a crosslinked methyl methacrylate-styrene copolymer particle and a silica particle are preferable as the translucent particle from the viewpoint of making coating unevenness or interference unevenness not conspicuous or the costs. In the case of using a crosslinked methyl methacrylate-styrene copolymer particle, a copolymerization ratio of styrene is preferably 50% or more and not more than 90%.

With respect to the shape of the particle, all of a truly spherical shape and an amorphous shape can be used. With respect to the particle size distribution, a monodispersed particle is preferable in view of control properties of a haze value and diffusibility and homogeneity of coating surface properties. For example, in the case where a particle having a particle size of at least 20% larger than the average particle size is defined as a coarse particle, a proportion of this coarse particle is preferably not more than 1%, more preferably not more than 0.1%, and further preferably not more than 0.01% of the number of all particles. A particle having such particle size distribution is obtained by classification after a usual synthetic reaction. By increasing the number of classification or strengthening its degree, a particle with more preferred distribution can be obtained.

The particle size distribution of the particle is measured by a Coulter counter, and the measured distribution is converted into particle number distribution. The average particle size is calculated from the obtained particle distribution.

In the antiglare film of the invention, a haze value to be caused due to surface scattering is preferably from 0 to 10%, and more preferably from 0.5 to 5%. When the surface haze falls within this range, an antiglare film with excellent firmness of black color is obtained. Also, a haze value to be caused due to internal scattering is preferably from 8 to 90%, more preferably from 10 to 40%, and most preferably from 10 to 30%. When the internal haze falls within this range, two performances of prevention of a lowering of the surface contrast and glare can be satisfied from the standpoint of practical use. The regulation of these hazes can be achieved by regulating the kind and amount of the translucent particle.

(Matrix Forming Binder of Antiglare Layer)

Though the binder for forming a matrix which forms the antiglare layer is not particularly limited, it is preferably a translucent polymer having, as a principal chain, a saturated hydrocarbon chain or a polyether chain after curing with ionizing radiations or the like. Also, it is preferable that the principal binder polymer after curing has a crosslinking structure.

The binder polymer containing, as a principal chain, a saturated hydrocarbon chain after curing is preferably an ethylenically unsaturated monomer selected among compounds of the following first group or a polymer thereof. Also, the polymer containing, as a principal chain, a polyether chain is preferably an epoxy based monomer selected among compounds of the following second group or a polymer obtained by ring opening thereof. Furthermore, polymers of a mixture of these monomers are also preferable.

In the invention, with respect to compounds of the first group, a polymer or a copolymer of a monomer having two or more ethylenically unsaturated groups is preferable as the binder polymer containing, as a principal chain, a saturated hydrocarbon chain and having a crosslinking structure. In order to make these polymer or copolymer have a high refractive index, it is preferable that the structure of this monomer contains an aromatic ring or at least one member selected from a halogen atom other than fluorine, a sulfur atom, a phosphorus atom and a nitrogen atom.

Examples of the monomer containing two or more ethylenically unsaturated groups which is used for the binder polymer for forming an antiglare layer include esters of a polyhydric alcohol and (meth)acrylic acid (for example, ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate); vinylbenzene and derivatives thereof (for example, 1,4-divinylbenzene, 2-acryloylethyl 4-vinylbenzoate and 1,4-divinylcyclohexanone); vinylsulfones (for example, divinylsulfone); and (meth)acrylamides (for example, methylenebisacrylamide).

Furthermore, there are exemplified resins having two or more ethylenically unsaturated groups, for example, relatively low molecular weight polyester resins, polyether resins, acrylic resins, epoxy resins, urethane resins, alkyd resins, spiro acetal resins, polybutadiene resins, polythiol polyene resins and oligomers or prepolymers of a polyfunctional compounds such as polyhydric alcohols. Two or more kinds of these monomers may be used in combinations. Also, it is preferable that the resin having two or more ethylenically unsaturated groups is contained in an amount of from 10 to 100% based on the whole amount of the binder.

The polymerization of such an ethylenically unsaturated group-containing monomer can be carried out upon irradiation with ionizing radiations or by heating in the presence of a photo radical polymerization initiator or a heat radical polymerization initiator. Accordingly, the antiglare layer is formed by preparing a coating solution containing an ethylenically unsaturated group-containing monomer, a photo radical polymerization initiator or a heat radical polymerization initiator and particles and optionally, an inorganic filler, a coating auxiliary, other additives, an organic solvent, etc., coating the subject coating solution on a transparent support and then curing it by a polymerization reaction by ionizing radiations or heat. It is also preferred to combine curing by ionizing radiations with curing by heat. As the photo or heat polymerization initiator, commercially available compounds can be utilized. They are described in *Saishin UV Koka Gijutsu* (Latest UV Curing Technologies) (page 159, issuer: Kazuhiro Takasusuki, publishing office: Technical Information Institute Co., Ltd., published in 1991) and catalogues of Ciba Specialty Chemicals.

In the invention, with respect to compounds of the second group, for the purpose of reducing curing and shrinkage of a cured film, it is preferred to use an epoxy based compound as described below. As such an epoxy group-containing monomer, a monomer containing two or more epoxy groups in one molecule thereof is preferable. Examples thereof include epoxy based monomers as described in JP-A-2004-264563, JP-A-2004-264564, JP-A-2005-37737, JP-A-2005-37738, JP-A-2005-140862, JP-A-2005-140863 and JP-A-2002-322430.

For the purpose of reducing curing and shrinkage, the epoxy group-containing monomer is preferably contained in an amount of from 20 to 100% by mass, more preferably from 35 to 100% by mass, and further preferably from 50 to 100% by mass based on the whole of binders constituting the layer.

Examples of a photo acid generator capable of generating a cation by the action of light for the purpose of polymerizing the epoxy based monomer or compound include ionic compounds such as triaryl sulfonium salts and diaryl iodonium salts and nonionic compounds such as a nitrobenzyl ester of sulfonic acid; and various known photo acid generators such as compounds described in *Organic Materials for Imaging*, edited by The Japanese Research Association for Organic Electronics Materials and published by Bun-Shin Shuppan K. K. (1997) and the like can be used. Of these, sulfonium salts and iodonium salts are especially preferable; and $PF_6^-$, $SbF_6^-$, $AsF_6^-$, $B(C_6H_5)_4^-$ and so on are preferable as a counter ion thereof.

The polymerization initiator is preferably used in an amount in the range of from 0.1 to 15 parts by mass, and more preferably in the range of from 1 to 10 parts by mass in terms of the total amount of the polymerization initiator based on 100 parts by mass of the foregoing first group or second group compound.

(Polymer Compound of Antiglare Layer)

The antiglare layer of the invention may contain a polymer compound. By adding the polymer compound, it is possible to minimize curing and shrinkage or to regulate the density of the coating solution.

The polymer compound already forms a polymer at a point of time of addition in the coating solution. As the polymer compound, resins, for example, cellulose esters (for example, cellulose triacetate, cellulose diacetate, cellulose propionate, cellulose acetate propionate, cellulose acetate butyrate, cellulose nitrate, etc.), urethane acrylates, polyester acrylates, (meth)acrylic esters (for example, methyl methacrylate/methyl (meth)acrylate copolymers, methyl methacrylate/ethyl (meth)acrylate copolymers, methyl methacrylate/butyl (meth)acrylate copolymers, methyl methacrylate/styrene copolymers, methyl methacrylate/(meth)acrylic acid copolymers, polymethyl methacrylate, etc.), polystyrenes and so on are preferably used.

From the viewpoints of an effect against curing and shrinkage and an effect for increasing the density of the coating solution, the polymer compound is preferably contained in an amount in the range of from 1 to 50% by mass, and more preferably from 5 to 40% by mass relative to the whole of binders which are contained in the layer containing the polymer compound. Also, the molecular weight of the polymer compound is preferably from 3,000 to 400,000, more preferably from 5,000 to 300,000, and further preferably from 5,000 to 200,000 in terms of mass average.

(Inorganic Filler of Antiglare Layer)

In the antiglare layer of the invention, in addition to the foregoing translucent particle, an inorganic filler can be used, for the purposes of adjusting the refractive index, adjusting the film strength and reducing curing and shrinkage and further depending upon reducing the reflectance in the case of providing a low refractive index layer. It is also preferable that the antiglare layer of the invention contains a fine inorganic filler with a high refractive index which is made of an oxide containing at least one metal element selected among titanium, zirconium, aluminum, indium, zinc, tin and antimony and which generally has an average particle size of not more than 0.2 μm, preferably not more than 0.1 μm, and more preferably not more than 0.06 μm and 1 nm or more in terms of a an average particle size of the primary particle.

In the case where it is necessary that the refractive index of the matrix is lowered for the purpose of regulating a difference in refractive index from the translucent particle, a fine inorganic filler with a low refractive index such as a silica fine particles and a hollow silica fine particle can be used as the inorganic filler. A preferred particle size thereof is the same as in the foregoing fine inorganic filler with a high refractive index.

It is also preferable that the surface of the inorganic filler is subjected to a silane coupling treatment or a titanium coupling treatment, and a surface treating agent having a functional group capable of reacting with a species of the binder on the filler surface is preferably used.

The addition amount of the inorganic filler is preferably from 10 to 90% by mass, more preferably from 20 to 80% by mass, and especially preferably from 30 to 75% by mass of the total mass of the antiglare layer.

Since the inorganic filler has a particle size sufficiently shorter than the wavelength of light, it has such properties that scattering is not generated and that a dispersion material having the subject filler dispersed in a binder polymer is an optically uniform substance.

(Surfactant of Antiglare Layer)

In the antiglare layer of the invention, in particular, for the purpose of ensuring uniformity in surface properties by suppressing a fault of surface properties such as coating unevenness, drying unevenness and point defect, it is preferable that any one or both of a fluorine based surfactant and a silicone based surfactant are contained in a coating composition for forming an antiglare layer. In particular, a fluorine based surfactant is preferably used because it reveals an effect for improving a fault of surface properties of the optical film of the invention such as coating unevenness, drying unevenness and point defect in a smaller addition amount.

The surfactant is used for the purpose of enhancing the productivity by bringing high-speed coating adaptability while enhancing the uniformity in surface properties. Preferred examples of the fluorine based surfactant include compounds disclosed in paragraphs [0049] to [0074] of JP-A-2007-188070.

The addition amount of the surfactant (in particular, a fluorine based polymer) which is used in the antiglare layer of the invention is preferably in the range of from 0.001 to 5% by mass, more preferably in the range of from 0.005 to 3% by mass, and further preferably in the range of from 0.01 to 1% by mass relative to the coating solution. When the addition amount of the surfactant is 0.001% by mass or more, the effect is sufficient; and when it is not more than 5% by mass, drying of the coating film is sufficiently carried out, and a satisfactory performance (for example, reflectance and abrasion resistance) as the coating film is obtained.

(Organic Solvent of Coating Solution for Antiglare Layer)

An organic solvent can be added to the coating composition for forming an antiglare layer.

Examples of the organic solvent include alcohol based solvents such as methanol, ethanol, n-propanol, isopropanol, n-butanol, isobutanol, sec-butanol, tert-butanol, isoamyl alcohol, 1-pentanol, n-hexanol and methylamyl alcohol; ketone based solvents such as methyl isobutyl ketone, methyl ethyl ketone, diethyl ketone, acetone, cyclohexanone and diacetone alcohol; ester based solvents such as methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl lactate and ethyl lactate; ether or acetal based solvents such as 1,4-dioxane, tetrahydrofuran, 2-methylfuran, tetrahydropyrane and diethyl acetal; hydrocarbon based solvents such as hexane, heptane, octane, isooctane, ligroin, cyclohexane, methylcyclohexane, toluene, xylene, ethylbenzene, styrene and divinylbenzene; halogenated hydrocarbon based solvents such as carbon tetrachloride, chloroform, methylene chloride, ethylene chloride, 1,1,1-trichloroethane, 1,1,2-trichloro ethane, trichloroethylene, tetrachloroethylene and 1,1,1,2-tetrachloroethane; polyhydric alcohol and its derivative based solvents such as ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentanediol, glycerin monoacetate, glycerin ethers and 1,2,6-hexanetriol; fatty acid based solvents such as formic acid, acetic acid, propionic acid, butyric acid, isobutyric acid, isovaleric acid and lactic acid; nitrogen compound based solvents such as formamide, N,N-dimethylformamide, acetamide and acetonitrile; and sulfur compound based solvents such as dimethyl sulfoxide.

Of these organic solvents, methyl isobutyl ketone, methyl ethyl ketone, cyclohexanone, acetone, toluene, xylene, ethyl acetate, 1-pentanol and so on are especially preferable. Also, for the purpose of controlling the cohesion properties, an alcohol or polyhydric alcohol based solvent may be properly mixed and used as the organic solvent. Such an organic solvent may be used singly or in admixture and is preferably contained in an amount of from 20% by weight to 90% by weight, more preferably from 30% by weight to 80% by weight, and most preferably from 40% by weight to 70% by weight in the terms of a total amount of the organic solvents in the coating solution. For the purpose of stabilizing the surface shape of the antiglare layer, it is preferred to use a solvent having a boiling point of lower than 100° C. and a solvent having a boiling point of 100° C. or high in combinations.

(Curing of Antiglare Layer)

The antiglare layer can be formed by coating the coating solution on a support and then applying irradiation with light, irradiation with electron beams, heating treatment, etc. thereto, thereby undergoing a crosslinking or polymerization reaction. In the case of irradiation with ultraviolet rays, ultraviolet rays emitted from light beams of an extra-high pressure mercury vapor lamp, a high pressure mercury vapor lamp, a low pressure mercury vapor lamp, a carbon arc lamp, a xenon arc lamp, a metal halide lamp and so on can be utilized. Curing by ultraviolet rays is preferably carried out in an atmosphere where an oxygen concentration is preferably controlled by purging with nitrogen, etc. to an extent of not more than 4% by volume, more preferably not more than 2% by volume, and most preferably not more than 0.5% by volume.

(Transparent Plastic Film Substrate)

As the transparent plastic film substrate (transparent support) of the invention, it is preferred to use a plastic film. Examples of a polymer capable of forming a plastic film include cellulose acylates (for example, triacetyl cellulose, diacetyl cellulose, and representatively TAC-TD80U and TAC-TD80UF (all of which are manufactured by Fujifilm Corporation), etc.), polyamides, polycarbonates, polyesters (for example, polyethylene terephthalate and polyethylene naphthalate), polystyrenes, polyolefins, norbornene based resins (for example, ARTON (a trade name, manufactured by JSR Corporation)), amorphous polyolefins (for example, ZEONEX (a trade name, manufactured by Zeon Corporation)) and (meth)acrylic resins (for example, ACRYPET VRL20A (a trade name, manufactured by Mitsubishi Rayon Co., Ltd. and ring structure-containing acrylic resins disclosed in JP-A-2004-70296 and JP-A-2006-171464). Of these, triacetyl cellulose, polyethylene terephthalate and polyethylene naphthalate are preferable; and triacetyl cellulose is especially preferable.

The thickness of the transparent support which can be used is usually from about 25 μm to 1,000 μm, preferably from 25 μm to 250 μm, and more preferably from 30 μm to 90 μm.

Though the width of the transparent support is arbitrary, it is usually from 100 to 5,000 mm, preferably from 800 to 3,000 mm, and more preferably from 1,000 to 2,000 mm from the standpoints of handling, yield and productivity. The transparent support can be dealt in a roll-shaped long state, and its length is usually from 100 m to 5,000 m, and preferably from 500 m to 3,000 m.

The surface of the transparent support is preferably smooth, and its average roughness Ra value is preferably not more than 1 μm, more preferably from 0.0001 to 0.5 μm, and further preferably from 0.001 to 0.1 μm.

In the case where the optical film of the invention is used in a liquid crystal display device, it can be arranged on the outermost surface of the display device by providing an adhesive layer on one surface thereof or other measure. Also, the optical film of the invention may be combined with a polarizing plate. In the case where the subject transparent support is triacetyl cellulose, since the triacetyl cellulose is used as a protective film for protecting a polarizing film of the polarizing plate, it is preferred in view of costs to use the optical film of the invention as a protective film as it stands.

In the case where the antiglare film of the invention is used as a protective film for polarizing plate as it stands, for the purpose of sufficiently achieving adhesion, it is preferred to carry out a saponification treatment after forming an outermost layer on the transparent support. The saponification treatment is carried out by a known measure, for example, dipping the subject film in an alkaline solution for a proper period of time. It is preferable that after dipping in the alkaline solution, the subject film is thoroughly washed with water or that the subject film is dipped in a dilute acid, thereby neutralizing an alkaline component such that the alkaline component does not remain in the subject film.

By carrying out the saponification treatment, the surface of the transparent support on the opposite side to the side having the outermost layer is hydrophilized.
(Coating System)

The antiglare film of the invention can be formed by the following method, but it should not be construed that the invention is limited thereto. First of all, a coating solution containing components for forming each layer is prepared. Subsequently, a coating solution for forming an antiglare layer is coated on a transparent support by a dip coating process, an air knife coating process, a curtain coating process, a roller coating process, a wire bar coating process, a gravure coating process or a die coating process, followed by heating and drying. Above all, a microgravure coating process, a wire bar coating process and a die coating process (see, for example, U.S. Pat. No. 2,681,294 and JP-A-2006-122889) are more preferable, with a die coating process being especially preferable.

Thereafter, the monomer for forming an antiglare layer is polymerized and cured upon irradiation with light or by heating. In this way, the antiglare layer is formed.

Subsequently, a coating solution for forming an abrasion resistant layer is similarly coated on the antiglare layer and irradiated with light, thereby forming the abrasion resistant layer. There is thus obtained the antiglare film of the invention.

In the case of forming other functional layer in a lower layer of the antiglare layer or between the antiglare layer and the abrasion resistant layer, such other functional layer can be formed using the same process as in the antiglare layer.
(Polarizing Plate)

A polarizing plate is configured mainly of two protective films for protecting the both surfaces of a front side and a rear side of a polarizing film. It is preferable that the optical film of the invention is used for at least one of the two protective films interposing a polarizing film from the both surfaces thereof. When the optical film of the invention also serves as a protective film, the manufacturing costs of a polarizing plate can be reduced. Also, by using the optical film of the invention as an outermost surface layer, it is possible to form a polarizing plate which is prevented from reflection of external light or the like and which is excellent in scar resistance, antifouling properties, etc.

A hydrophilized surface is especially effective for improving the adhesion properties to a polarizing film containing, as a main component, polyvinyl alcohol. Also, in the hydrophilized surface, since dusts in air hardly attach thereto, the dusts hardly come into a space between the polarizing film and the optical film during adhesion to the polarizing film. Thus, the hydrophilized surface is effective for preventing a point defect to be caused due to the dusts.

The saponification treatment is preferably carried out such that a contact angle of the surface of the transparent support on the side opposite to the side having the outermost layer against water is preferably not more than 40°, more preferably not more than 30°, and especially preferably not more than 20°.
(Image Display Device)

The optical film of the invention can be applied to image display devices such as a liquid crystal display device (LCD), a plasma display panel (PDP), an electroluminescence display device (ELD), a cathode ray tube display device (CRT) and a surface-conduction electron-emitter display (SED). In particular, the optical film of the invention is preferably used in a liquid crystal display device (LCD). Since the optical film of the invention has a transparent support, it is used by adhesion of the side of the transparent support to an image display surface of an image display device.

In the case where the optical film of the invention is used as one side of a surface protective film of a polarizing film, it can be preferably used for transmission type, reflection type or semi-transmission type liquid crystal display devices of a twisted nematic (TN) mode, a super twisted nematic (STN) mode, a vertical alignment (VA) mode, an in-plane switching (IPS) mode, an optically compensatory bend cell (OCB) mode, etc.

EXAMPLES

The invention is hereunder described in detail with reference to the following Examples, but it should not be construed that the invention is limited thereto. All "part" and "%" are on a mass basis unless otherwise indicated.

| (Composition of coating solution A-1 for antiglare layer) | |
|---|---|
| PET-30 | 65.0 g |
| IRGACURE 127 | 3.0 g |
| 8 μm-crosslinked acrylate particle (30%) | 20.0 g |
| 8 μm-crosslinked acrylate•styrene particle (30%) | 52.6 g |
| FP-13 | 0.2 g |
| CAB | 0.5 g |
| MIBK | 72.6 g |
| MEK | 32.5 g |

Each of the foregoing components of the coating solution for antiglare layer was filtered through a polypropylene-made filter having a pore size of 30 μm, thereby preparing a coating solution.

In the foregoing coating solution, a matrix after curing had a refractive index of 1.525.

Here, the refractive index of the film of the antiglare layer excluding the translucent particle was directly measured by an Abbe's refractometer. Also, the refractive index of the translucent particle was measured by dispersing an equal amount of the translucent particle in a solvent prepared by changing a mixing ratio of two kinds of arbitrary solvents selected among methylene iodide, 1,2-dibromopropane and n-hexane and having a different refractive index from each other, thereby changing the refractive index, measuring a turbidity of the dispersion solution and then measuring a refractive index of the solvent when the turbidity became minimum by an Abbe's refractometer.

The refractive index of each of the particles was as follows.
8-μm crosslinked acrylate particle: 1.500
8-μm crosslinked acrylate•styrene particle: 1.555
(Surface Treatment of Inorganic Oxide Fine Particle)
(Preparation of Dispersion Solution B-1)

A silica fine particle sol (METHANOL SILICA SOL, manufactured by Nissan Chemical Industries, Ltd., average particle size: 12 nm, silica concentration: 30%) is designated as "dispersion solution B". By using the dispersion solution B, the solvent was substituted by means of vacuum distillation at 25° C. while adding methyl ethyl ketone (MEK) such that the total liquid amount was substantially constant. A dispersion solution B-1 was thus prepared so as to regulate the ultimate solids content at 20%.
(Preparation of Dispersion Solution B-2)

333 parts of a silica fine particle sol (METHANOL SILICA SOL, manufactured by Nissan Chemical Industries, Ltd., average particle size: 12 nm, silica concentration: 30%)

was mixed with 8 parts of acryloyloxypropyl trimethoxysilane and 1.5 parts of diisopropoxyaluminum ethyl acetate, and 9 parts of ion exchanged water was then added. The mixture was allowed to react at 60° C. for 8 hours, and the reaction mixture was then cooled to room temperature, followed by adding 1.8 parts of acetyl acetone. The solvent was substituted by means of vacuum distillation while adding MEK such that the total liquid amount was substantially constant. A dispersion solution B-2 was thus prepared so as to regulate the ultimate solids content at 20%.

(Composition of coating solution ASL-1 for abrasion resistant layer)

| | |
|---|---|
| Silica dispersion solution B-1 (20%) | 130.0 g |
| IPA-ST-L (30%) | 6.7 g |
| IRGACURE 127 | 3.4 g |
| DPHA | 67.6 g |
| CAB | 3.0 g |
| MEK | 2095.0 g |
| MMPG-Ac | 551.4 g |

(Composition of coating solution ASL-2 for abrasion resistant layer)

| | |
|---|---|
| Silica dispersion solution B-2 (20%) | 130.0 g |
| IPA-ST-L (30%) | 6.7 g |
| IRGACURE 127 | 3.4 g |
| DPHA | 67.6 g |
| CAB | 3.0 g |
| MEK | 2095.0 g |
| MMPG-Ac | 551.4 g |

(Composition of coating solution ASL-3 for abrasion resistant layer)

| | |
|---|---|
| Silica dispersion solution B-2 (20%) | 130.0 g |
| IPA-ST-L (30%) | 6.7 g |
| IRGACURE 127 | 3.4 g |
| DPHA | 67.6 g |
| PMMA | 3.0 g |
| MEK | 2095.0 g |
| MMPG-Ac | 551.4 g |

(Composition of coating solution ASL-4 for abrasion resistant layer

| | |
|---|---|
| Silica dispersion solution B-2 (20%) | 130.0 g |
| IRGACURE 127 | 3.4 g |
| DPHA | 69.6 g |
| CAP | 1.0 g |
| MEK | 2101.7 g |
| MMPG-Ac | 551.4 g |

(Composition of coating solution ASL-5 for abrasion resistant layer)

| | |
|---|---|
| Silica dispersion solution B-2 (20%) | 130.0 g |
| IRGACURE 127 | 3.4 g |
| DPHA | 68.6 g |
| CAP | 2.0 g |
| MEK | 2101.7 g |
| MMPG-Ac | 551.4 g |

(Composition of coating solution ASL-6 for abrasion resistant layer)

| | |
|---|---|
| Silica dispersion solution B-2 (20%) | 130.0 g |
| IRGACURE 127 | 3.4 g |
| DPHA | 65.6 g |
| CAP | 5.0 g |
| MEK | 2101.7 g |
| MMPG-Ac | 551.4 g |

(Composition of coating solution ASL-7 for abrasion resistant layer)

| | |
|---|---|
| Silica dispersion solution B-2 (20%) | 130.0 g |
| IRGACURE 127 | 3.4 g |
| DPHA | 63.6 g |
| CAP | 5.0 g |
| MEK | 2101.7 g |
| MMPG-Ac | 551.4 g |

(Composition of coating solution ASL-8 for abrasion resistant layer)

| | |
|---|---|
| Silica dispersion solution B-2 (20%) | 130.0 g |
| IRGACURE 127 | 3.4 g |
| DPHA | 67.6 g |
| MEK | 2101.7 g |
| MMPG-Ac | 551.4 g |

Each of the foregoing coating solutions for abrasion resistant layer was filtered through a polypropylene-made filter having a pore size of 1 μm, thereby preparing a coating solution. All of the abrasion resistant layers obtained by coating and curing each of the foregoing coating solutions had a refractive index after curing of 1.50.

The respective compounds which were used are as follows.

PET-30: Mixture of pentaerythritol triacrylate and pentaerythritol tetraacrylate (manufactured by Nippon Kayaku Co., Ltd.)

DPHA: Mixture of dipentaerythritol pentaacrylate and dipentaerythritol hexaacrylate (manufactured by Nippon Kayaku Co., Ltd.)

8 μm-crosslinked acrylate particle (30%): 30 wt % dispersion solution in MIBK having an average particle size of 8.0 μm (manufactured by Soken Chemical & Engineering Co., Ltd.), which was prepared by dispersion by a Polytron disperser at 10,000 rμm for 20 minutes 8 μm-crosslinked acrylate•styrene particle (30%): 30 wt % dispersion solution in MIBK having an average particle size of 8.0 μm (manufactured by Sekisui Plastics Co., Ltd.), which was prepared by dispersion by a Polytron disperser at 10,000 rμm for 20 minutes IRGACURE 127: Polymerization initiator (manufactured by Ciba Specialty Chemicals)

CAB: Cellulose acetate butyrate (number average molecular weight: about 40,000)

CAP: Cellulose acetate propionate (number average molecular weight: about 40,000)

PMMA: Polymethyl methacrylate (number average molecular weight: about 40,000)

MIBK: Methyl isobutyl ketone

MEK: Methyl ethyl ketone

MMPG-Ac: Propylene glycol monomethyl ether acetate

IPA-ST-L: Silica fine particle sol (manufactured by Nissan Chemical Industries, Ltd., average particle size: about 45 nm, silica concentration: 30%)

SP-13: Fluorine based surfactant (used after being dissolved as a 10% by mass solution in MEK)

SP-13
Mw 14000

Example 1

Preparation of Antiglare Film Samples 101 to 112

(1) Application of Antiglare Layer:

An 80 μm-thick triacetyl cellulose film (TAC-TD80U, manufactured by Fujifilm Corporation) was wound out in a rolled form; the coating solution A-1 for antiglare layer was coated thereon under a condition at a conveying rate of 30 m/min by a die coating process using a slot die disclosed in Example 1 of JP-A-2006-122889 and dried at 60° C. for 150 seconds; and thereafter, the coating layer was cured upon irradiation with ultraviolet rays having a radiation illuminance of 400 mW/cm$^2$ and an irradiation dose of 100 mJ/cm$^2$ by using an air-cooled metal halide lamp (manufactured by Eyegraphics Co., Ltd.) of 160 W/cm in an oxygen concentration of about 0.1% under purging with nitrogen, followed by winding up. The coating amount was regulated such that the film thickness of each of the antiglare layers was 13 μm.

(2) Application of Abrasion Resistant Layer:

The triacetyl cellulose film having the subject antiglare layer applied thereon was again wound out; the foregoing coating solution for abrasion resistant layer was coated thereon under a condition at a conveying rate of 30 m/min in the foregoing die coating process using a slot die and dried at 90° C. for 75 seconds; and thereafter, the coating layer was irradiated with ultraviolet rays having a radiation illuminance of 400 mW/cm$^2$ and an irradiation dose of 240 mJ/cm$^2$ by using an air-cooled metal halide lamp (manufactured by Eyegraphics Co., Ltd.) of 240 W/cm in an oxygen concentration of from 0.01 to 0.1% under purging with nitrogen. The coating amount was regulated so as to have a film thickness as shown in Table 1, thereby forming an abrasion resistant layer, followed by winding up to form an antiglare film. In the sample 101, the abrasion resistant layer was not laminated.

(Saponification Treatment of Antiglare Film)

Each of the thus prepared samples 101 to 112 was subjected to the following treatment. That is, a sodium hydroxide aqueous solution of 1.5 moles/L was prepared and kept at a temperature of 55° C. A dilute sulfuric acid aqueous solution of 0.01 moles/L was prepared and kept at a temperature of 35° C. The prepared optical film was dipped in the foregoing sodium hydroxide aqueous solution for 2 minutes and then dipped in water, thereby thoroughly washing away the sodium hydroxide aqueous solution. Subsequently, the resulting optical film was dipped in the foregoing dilute sulfuric acid aqueous solution for one minute and then dipped in water, thereby thoroughly washing away the dilute sulfuric acid aqueous solution. Finally, the sample was thoroughly dried at 120° C. There were thus prepared saponified optical films (101 to 112).

(Preparation of Polarizing Plate)

The both surfaces of a polarizing film which had been prepared by adsorbing iodine onto polyvinyl alcohol and stretched were adhered to and protected by an 80 μm-thick triacetyl cellulose film (TAC-TD80U, manufactured by Fujifilm Corporation) which had been dipped in an NaOH aqueous solution of 1.5 moles/L at 55° C. for 2 minutes, neutralized and then washed with water and each of the films of the samples (having been subjected to a saponification treatment) of the invention in Example 1, thereby preparing a polarizing plate. There were thus prepared polarizing plates.

(Evaluation of Optical Film and Polarizing Plate)

The obtained optical film samples were each evaluated with respect to the following items. The results obtained are shown in Table 1.

(1) Evaluation of Wind Unevenness:

The antiglare film was cut out in an A4 size; a black adhesive-provided PET film was stuck onto the side side thereof; and the resulting film was visually evaluated according to the following criteria under a three band fluorescent lamp at 500 lux and 1,000 lux, respectively. According to the evaluation at 1,000 lux, even slight unevenness can be detected. Five A4-size sheets were observed, and the frequency of generation of unevenness was evaluated.

A: Even when observed at 1,000 lux, no unevenness is found.

B: When observed at 1,000 lux, unevenness is found in a number of not more than one, whereas when observed at 500 lux, no unevenness is found.

BC: When observed at 500 lux, unevenness is found in a number of not more than one.

C: When observed at 500 lux, unevenness is found in a number of from 1 to 3.

D: When observed at 500 lux, unevenness is found in a number of more than 3.

(2) Whitening:

The antiglare film was cut out in an A4 size; a black adhesive-provided PET film was stuck onto the rear side thereof; and the resulting film was visually evaluated with respect to the degree of whitishness according to the following criteria under a three band fluorescent lamp at 1,000 lux.

A: Whitishness is not substantially found.

B: Whitishness is slightly found.

C: Whitishness is clearly found.

(3) Evaluation of Scar Resistance by Steel Wool (SW):

A rubbing test was carried out using a rubbing tester under the following condition.

Evaluation environment condition: 25° C., 60% RH.

Rubbing material: Steel wool (manufactured by Nippon Steel Wool Co., Ltd., Grade No. 0000) was wound around a tip part (1 cm×1 cm) of the tester coming into contact with the sample and fixed by a band such that the sample did not move.

Movement distance (one way): 13 cm

Rubbing rate: 13 cm/sec

Load: 500 g/cm$^2$

Contact area of tip part: 1 cm×1 cm

Number of rubbing: 10 reciprocations

An oily black ink was applied on the rear side of the rubbed sample, and a scar of the rubbed portion was visually observed by reflected light and evaluated according to the following criteria.

A: Even by very careful observation, a scar is not observed at all.

B: By very careful observation, a weak scar is slightly observed.

BC: A weak scar is observed.

C: A scar is observed to a medium extent.

D: A scar is observed at the first glance.

TABLE 1

| Sample No. | Coating solution | Film thickness | Particle | Modification | Thickener | Content | Wind unevenness | Whitening | Abrasion resistance | |
|---|---|---|---|---|---|---|---|---|---|---|
| 101 | — | — | — | — | — | — | B | A | D | Comparison |
| 102 | ASL-1 | 0.10 μm | 28% | No | CAB | 3.0% | B | A | B | Invention |
| 103 | ASL-2 | 0.10 μm | 28% | Yes | CAB | 3.0% | A | A | A | Invention |
| 104 | ASL-2 | 0.20 μm | 28% | Yes | CAB | 3.0% | A | A | A | Invention |
| 105 | ASL-2 | 0.40 μm | 28% | Yes | CAB | 3.0% | C | A | A | Invention |
| 106 | ASL-2 | 0.60 μm | 28% | Yes | CAB | 3.0% | D | B | A | Comparison |
| 107 | ASL-3 | 0.10 μm | 28% | Yes | PMMA | 3.0% | B | B | B | Invention |
| 108 | ASL-4 | 0.10 μm | 26% | Yes | CAP | 1.0% | C | A | A | Invention |
| 109 | ASL-5 | 0.10 μm | 26% | Yes | CAP | 2.0% | A | A | A | Invention |
| 110 | ASL-6 | 0.10 μm | 26% | Yes | CAP | 5.0% | A | A | A | Invention |
| 111 | ASL-7 | 0.10 μm | 26% | Yes | CAP | 7.0% | B | A | B | Invention |
| 112 | ASL-8 | 0.10 μm | 26% | Yes | — | — | D | A | C | Comparison |

The following are clear from the results as shown in Table 1. That is, in the case where the antiglare layer has the abrasion resistant layer of the invention, and the subject abrasion resistant layer is made of a composition containing (A) a silicon oxide fine particle, (B) an ionizing radiation-curable resin and (C) a polymer thickener and has a film thickness of from 0.05 to 0.4 μm, an antiglare film which is free from wind unevenness and whitening, excellent in visibility and excellent in abrasion resistance can be obtained. In particular, in the antiglare films using a cellulose ester compound as the polymer thickener, the effect for preventing whitening was conspicuous. Also, it is noted from the viewpoints of wind unevenness and abrasion resistance that the case where the addition amount of the cellulose ester compound is from 2 to 5% relative to the total solids content of the abrasion resistant layer is preferable.

Example 2

Preparation of Antiglare Film Sample 113 Imparted with Antifouling Properties

An antiglare film sample 113 was prepared in the same manner as in the sample 103 in Example 1, except for changing the coating solution for abrasion resistant layer to the following ASL-9.

| (Composition of coating solution ASL-9 for abrasion resistant layer) | |
|---|---|
| Silica dispersion solution B-2 (20%) | 130.0 g |
| IPA-ST-L (30%) | 6.7 g |
| IRGACURE 127 | 3.4 g |
| DPHA | 65.6 g |
| CAB | 3.0 g |
| X-22-164C | 2.0 g |
| MEK | 2095.0 g |
| MMPG-Ac | 551.4 g |

X-22-164C: Polyfunctional methacryloyl-modified silicone (manufactured by Shin-Etsu Chemical Co., Ltd.)

The obtained sample 113 was evaluated in the same manner as in the sample 103 as prepared in Example 1. The antifouling properties were evaluated according to the following criteria.

(4) Antifouling Properties:

The state that a quick-drying ink ("McKee" (a registered trademark), manufactured by Zebra Co., Ltd.) written on the film surface was wiped off several times by "TORAYSEE" (a registered trademark, manufactured by Toray Industries, Inc.) was evaluated on three grades according to the following criteria.

A: The written mark was completely wiped off.
B: A part of the written mark remained without being fully wiped off.
C: A major part of the written mark remained without being fully wiped off It has been noted that the sample 113 has the performance equal to the sample 103 with respect to the wind unevenness, whitening and abrasion resistance and is excellent in the antifouling properties such that it is evaluated as "A" with respect to the antifouling properties.

According to the invention, an antiglare film which is excellent in abrasion resistance and which is also excellent in antiglare properties can be provided.

The entire disclosure of each and every foreign patent application from which the benefit of foreign priority has been claimed in the present application is incorporated herein by reference, as if fully set forth.

What is claimed is:

1. An antiglare film comprising:
a transparent plastic film substrate;
an antiglare layer having fine recesses and projections on a surface thereof; and
an abrasion resistant layer provided at an uppermost surface of the antiglare layer, the abrasion resistant layer having an average film thickness of from 0.03 to 0.4 μm,
wherein the abrasion resistant layer is formed from a curable composition containing at least the following components (A), (B), and (C):
(A) an inorganic fine particle containing silicon oxide as a main component and having an average particle size of from 1 to 300 nm;
(B) an ionizing radiation-curable resin; and
(C) a polymer thickener,
wherein the polymer thickener of the curable composition is a cellulose ester.

2. The antiglare film according to claim 1,
wherein a surface of the inorganic fine particle is subjected to a surface treatment with a compound represented by following formula (I):

$$(R^{10})_m\text{—Si}(X)_{4-m} \quad (I)$$

wherein $R^{10}$ represents a substituted or unsubstituted alkyl group or a substituted or unsubstituted aryl group; X represents a hydroxyl group or a hydrolyzable group; and m represents an integer of from 1 to 3.

3. The antiglare film according to claim 1,
wherein the abrasion resistant layer does not substantially contain a fluorine based binder.

4. The antiglare film according to claim 1,
wherein a refractive index of the abrasion resistant layer is lower than a refractive index of the antiglare layer.

5. The antiglare film according to claim 1,
wherein the antiglare layer contains at least one translucent resin and at least one translucent particle.

6. The antiglare film according to claim 5,
wherein the translucent particle of the antiglare layer has an average particle size of from 5.5 to 15 μm, and the antiglare layer has an average film thickness of from 8 to 40 μm.

7. A polarizing plate, comprising:
a polarizing film; and
two protective films,
wherein one of said two protective films is the antiglare film according to claim 1.

8. A polarizing plate, comprising:
a polarizing film; and
two protective films,
wherein one of said two protective films is the antiglare film according to claim 1; and
the other one of said two protective films is an optical compensating film with optical anisotropy.

9. An image display device, comprising:
an image display; and
the antiglare film according to claim 1 provided at a surface of the image display.

\* \* \* \* \*